United States Patent
Keenan et al.

(10) Patent No.: US 6,490,603 B1
(45) Date of Patent: Dec. 3, 2002

(54) METHOD AND SYSTEM FOR PRODUCING DOCUMENTS IN A STRUCTURED FORMAT

(75) Inventors: David Keenan; Anthony Joseph Donnelly, both of Dublin (IE)

(73) Assignee: Datapage Ireland Limited, Dublin (IE)

( * ) Notice: Subject to any disclaimer, the term of this patent is extended or adjusted under 35 U.S.C. 154(b) by 0 days.

(21) Appl. No.: 09/272,291

(22) Filed: Mar. 19, 1999

(30) Foreign Application Priority Data

Mar. 31, 1998 (IE) .............................................. 980234
Nov. 20, 1998 (IE) .............................................. 980959

(51) Int. Cl.[7] ............................................. G06F 17/21
(52) U.S. Cl. ....................... 707/513; 707/519; 707/523; 707/531
(58) Field of Search ................................ 707/513, 530, 707/501.1, 522, 523, 517–519, 529, 531

(56) References Cited

U.S. PATENT DOCUMENTS

| | | | | |
|---|---|---|---|---|
| 5,140,521 A | | 8/1992 | Kozol et al. ................. 364/419 |
| 5,388,194 A | * | 2/1995 | Vogel ........................ 358/1.18 |
| 5,557,720 A | | 9/1996 | Brown, Jr. .................. 395/146 |
| 5,649,222 A | * | 7/1997 | Mogilevsky ................ 707/533 |
| 5,778,402 A | * | 7/1998 | Gipson ....................... 707/523 |
| 6,014,680 A | * | 1/2000 | Sato et al. ................... 707/513 |
| 6,230,173 B1 | * | 5/2001 | Ferrel et al. ............. 707/501.1 |
| 6,266,681 B1 | * | 7/2001 | Guthrie ........................ 707/10 |
| 6,298,357 B1 | * | 10/2001 | Wexler et al. .............. 707/513 |
| 6,332,039 B1 | * | 12/2001 | Bando et al. ............... 382/181 |

FOREIGN PATENT DOCUMENTS

WO      WO98/34179      8/1998

* cited by examiner

*Primary Examiner*—Joseph H. Feild
(74) *Attorney, Agent, or Firm*—Jacobson Holman, PLLC

(57) ABSTRACT

Structured-format documents are produced in a process in which a file in a particular word processing format (input A) or in any other format (Input B) are converted (2) to a particular word processor format. The system loads a parameter activation table which sets document parameter values to allow DTDs to be automatically implemented. The document is cleaned (5) and tagged (6). The tagging provides an important link to allow automatic conversion at a later stage in the process. There is copy-editing (7) followed by validation of the file preparation stage. The involves automatic validation of tags, including validation of their order and nesting arrangement. Automatic conversion to SGML is performed in sequence of symbol/character conversion (20), tag conversion (21), equation processing(22), and floating element processing (23). Final validation (24) is then performed.

11 Claims, 6 Drawing Sheets

Figure 1A:
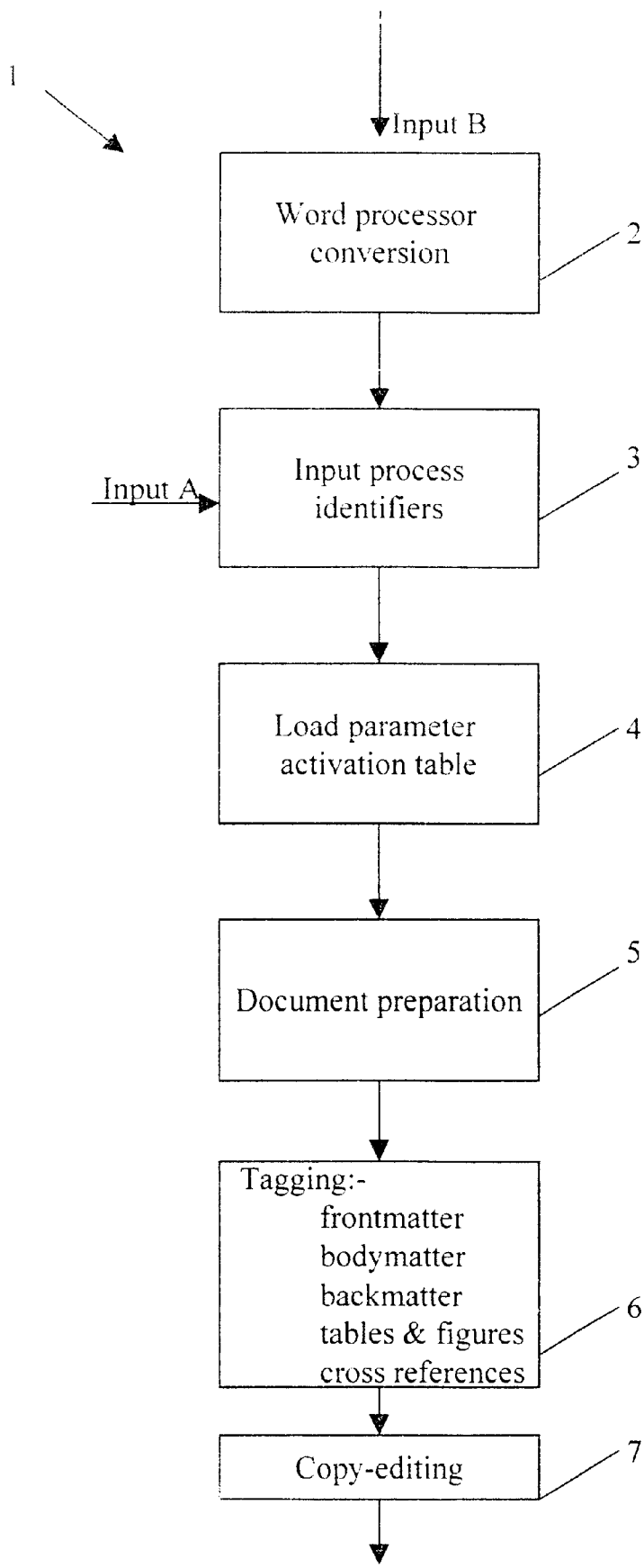

16. van der Aarden, A. B., C. Jones & D-F O'Rourke et al., 1990, Article title. In: Gurman, AS & DP Kniskern (Eds.), Book Title (Vols. I–III, 3$^{rd}$ edition), New York, London: Wiley Interscience, Inc., pp. 12–54.

17. van der Aarden, A B, C. Jones and D-F O'Rourke et al. (1991) in: Gurman, AS (editor), Book Title, 3$^{rd}$ edn, vol. I, pp. 12–54, Wiley Interscience, Inc.

18. van der Aarden, A. B, "Article title", in: Gurman, AS et al., editors, Book Title, 1992:12–54.

Fig. 2

<bib>16

<author> <snm>van der Aarden <fnm>A.B. <author>
<snm>Jones <fnm>C. <author> <snm>O'Rourke <fnm>D.-F. <et-al>
<title>Article title <editor> <snm>Gurman <fnm>A.S. <editor>
<snm>Kniskern <fnm>D.P.

<book-sertitle>Book title
<volume-nr>I—III<date>1990<first-page>12—54

<pub-name>Wiley Interscience<pub-loc>New York

<bib>17

<author> <snm>van der Aarden <fnm>A.B. <author>
<snm>Jones <fnm>C. <author> <snm>O'Rourke <fnm>D.-F. <et-al>

<editor> <snm>Gurman <fnm>A.S.
<edition>3rd ed

<book-sertitle>Book Title
<volume-nr>I<date>1991<first-page>12<last-page>54
<pub-name>Wiley Interscience <bib>18

<author> <snm>van der Aarden <fnm>A.B.
<title>Article title

<editor> <snm>Gurman <fnm>A.S. <et-al>
<book-title>Book Title
<date>1992<first-page>12<last-page>54

Fig. 3 id="bib16"><no>[16]</no><bb><contribution><authors><author><snm>van der Aarden</snm><fnm>A.B.</fnm><author><snm>Jones</snm><fnm>C.</fnm><author><snm>O’Rourke</snm><fnm>D.-F.</fnm><et-al><title>Article title<host><edited-book><editors><editor><snm>Gurman</snm><fnm>A.S.</fnm><editor><snm>Kniskern</snm><fnm>D.P.</fnm><book-series><series><title>Book title<volume-nr>I—III<date>1990<pages><first-page>12—54<publisher><name>Wiley Interscience<location>New York</bib><bib id="bib17"><no>[17]</no><bb><contribution><authors><author><snm>van der Aarden</snm><fnm>A.B.</fnm><author><snm>Jones</snm><fnm>C.</fnm><author><snm>O’Rourke</snm><fnm>D.-F.</fnm><et-al><host><edited-book><editors><editor><snm>Gurman</snm><fnm>A.S.</fnm><edition>3rd ed<book-series><series><title>Book Title<volume-nr>I<date>1991<pages><first-page>12<last-page>54<publisher><name>Wiley Interscience</bib><bib id="bib18"><no>[18]</no><bb><contribution><authors><author><snm>van der Aarden</snm><fnm>A.B.</fnm><title>Article title<host><edited-book><editors><editor><snm>Gurman</snm><fnm>A.S.</fnm><et-al><title>Book Title<date>1992<pages><first-page>12<last-page>54</bib>

Fig. 4

METHOD AND SYSTEM FOR PRODUCING DOCUMENTS IN A STRUCTURED FORMAT

FIELD OF THE INVENTION

The invention relates to production of documents in a structured format such as in Standardized General Markup Language (SGML) format.

Prior Art Discussion

A structured format such as SGML allows output of a document in a wide variety of formats using available tools. Such a structured format is therefore of enormous benefit to the document production industry, such as for publication of academic journals. In the art, WO98/34179, U.S. Pat. No. 5,557,720, and U.S. Pat. No. 5,140,521 describe techniques for processing structured-format documents. In general, this prior art relates to either altering a structured-format document, or processing such documents to generate a required output format for either display or printing.

However, a major problem for production of documents in a structured format is that of reaching this format. If the document is authored in the structured format, then specialised knowledge is required and the task is time-consuming. Alternatively, if the document is authored in a conventional word processor format and is subsequently converted, the conversion is very time-consuming and is error-prone.

Objects of the Invention

The invention is therefore directed toward providing a process for producing a document in a structured format in a more efficient manner.

Another object is that errors in the document be consistently reduced.

SUMMARY OF THE INVENTION

According to the invention, there is provided a document production process carried out by a system comprising a processor having an editor interface and memory access means, the process comprising the steps of writing a document comprising characters in a word processor format to memory;

writing document publication parameter values to memory;

automatically correcting the document according to typesetting rules;

automatically tagging the document to delimit character strings by inserting tags next to the associated character strings, the tagging being performed according to the publication parameter values; and automatically converting the document to a structured format by substituting tags with structured format code to provide a structured document.

The steps of automatically correcting according to typesetting rules, automatic tagging, and automatic conversion allow for a highly automated process for bringing a document from a standard word processor format to a structured format. This allows the document author to use a word processor which he or she is familiar with, and divorces him or her from structured format techniques. These steps also help to ensure that errors are minimised.

In one embodiment, conversion is performed by automatic comparison of tags with reference tags stored in look-up tables.

Preferably, the conversion step includes the sub-steps of recognising foreign objects in the document, exporting the foreign objects to a separate process, converting the foreign objects to a text format, and subsequently importing the text and processing the text to convert to the structured format.

In one embodiment, the conversion step comprises the sub-step of separately converting floating elements according to document parameter values and structure of the floating element.

These automatic conversion steps in sequence provide comprehensive conversion to a structured format.

Preferably, the process comprises the further step of parsing the structured format code for final validation. This helps to ensure document quality.

In one embodiment, the document parameter values are written as an array of flags to load an activation table which activates and deactivates parameter options. This is a very effective way of recording parameter values for a particular document.

Preferably, the tagging step involves automatic recognition of elements.

In one embodiment, the process comprises the further step of copy-editing the document after tagging by automatically converting words according to a break-down of the word characters.

In another embodiment, the copy-editing step includes the sub-steps of building an array of document references by automatic recognition and subsequently sorting them according to an operator-inputted sort criterion.

Preferably, the process comprises the further step of automatic pre-conversion validation, in which tags are compared with reference tags and nesting is validated according to the document parameter values.

In one embodiment, the pre-conversion validation step includes the sub-step of automatically locating any invalid symbols and generating corresponding error messages.

In another embodiment, the pre-conversion validation step includes the sub-step of automatically identifying references, building an array in memory, and searching to determine if any do not exist in the document.

According to another aspect, the invention provides a document production system comprising a processor having an editor interface and memory access means, the processor comprising:

means for writing a document comprising characters in a word processor format to memory;

means for writing document publication parameter values to memory;

means for automatically correcting the document according to typesetting rules;

means for automatically tagging the document to delimit character strings by inserting tags next to the associated character strings, the tagging being performed according to the publication parameter values; and automatically converting the document to a structured format by substituting tags with structured format code to provide a structured document.

Detailed Description of the Invention

BRIEF DESCRIPTION OF THE INVENTION

Figure 1B:
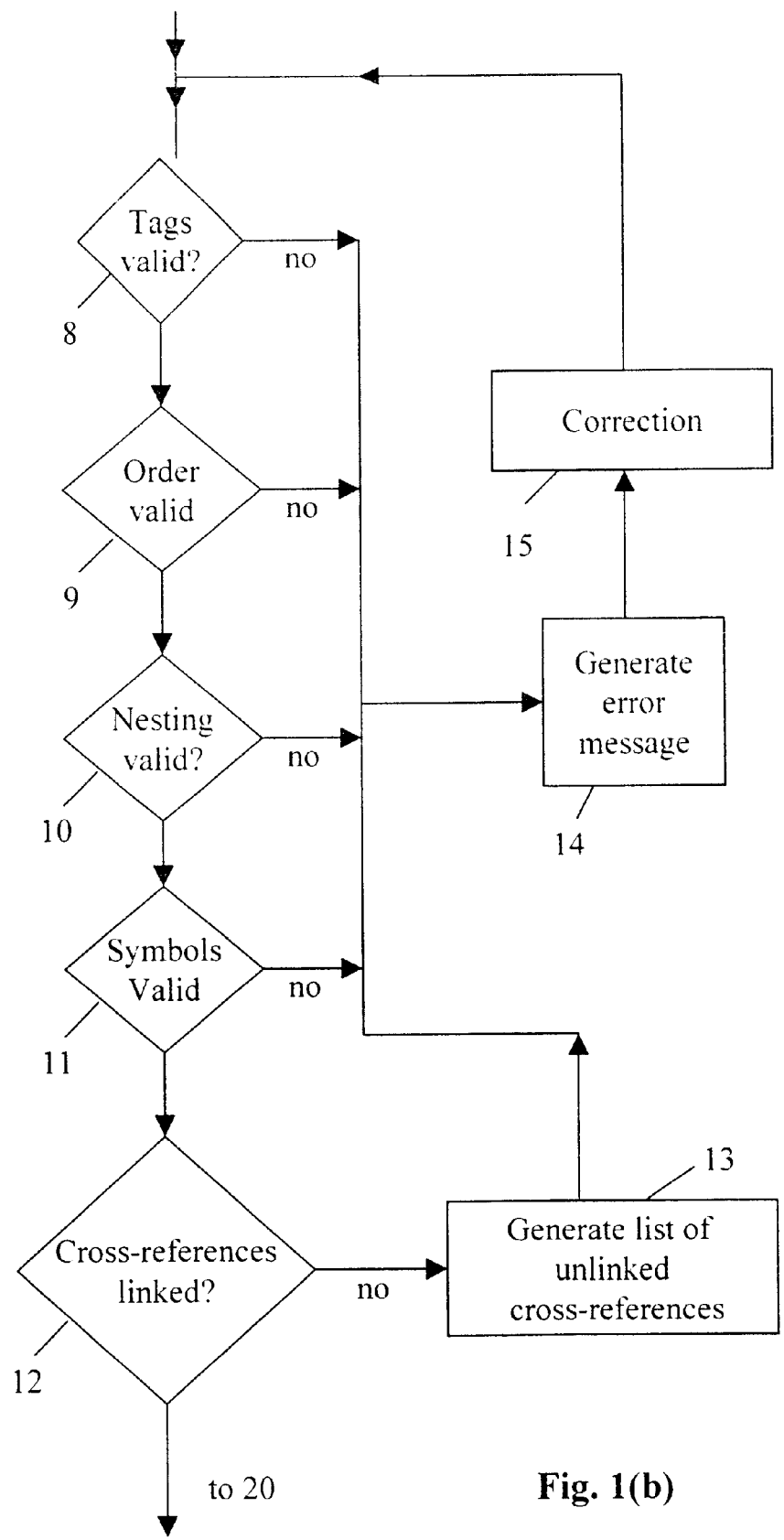
Figure 1C:
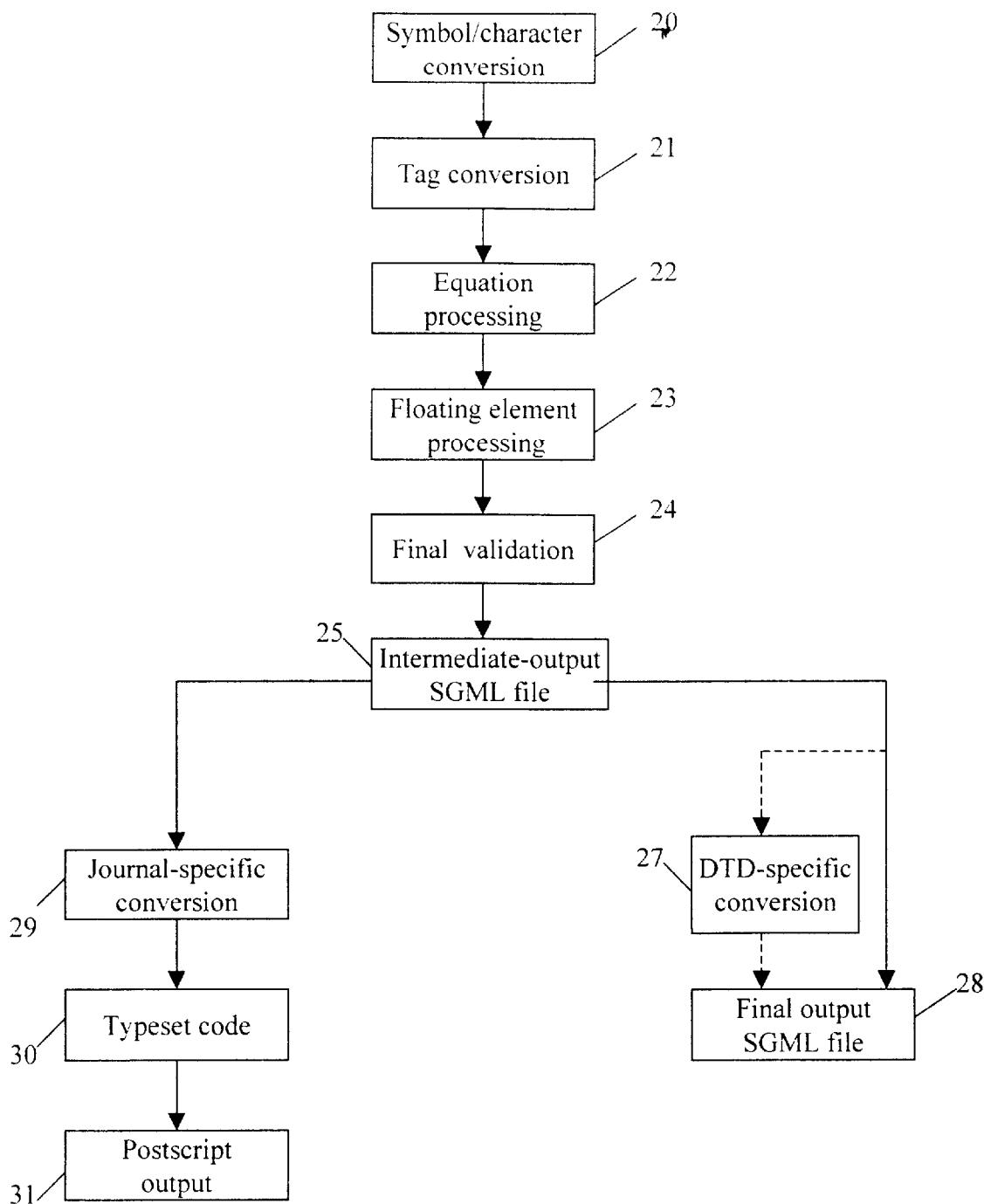

The invention will be more clearly understood from the following description of some embodiments thereof, given by way of example only with reference to the accompanying drawings in which:

FIGS. 1(a), 1(b) and 1(c) are together a flow chart illustrating a production process of the invention; and FIGS. 2 to 4 are samples of a document at various process stages.

DESCRIPTION OF THE EMBODIMENTS

The drawings show a process 1 for producing a document in a structured format, in this embodiment SGML. The process 1 is carried out by a conventional hardware system such as a PC or a client/server network architecture. The hardware is programmed for typesetting as described in the following description of the process 1.

The process takes an authored document in a particular word processor format (input A), or in a different word processor format or a manually type-written document (input B). If input B, the process in step 2 converts the document to the particular word processor format by optical character recognition or word processor conversion as applicable. FIG. 2 is a sample from a received document in Word™ format. As is clear from FIG. 2, this is totally conventional as the author can work with a conventional word processor and needs no knowledge of structured formats.

In step 3 process identifiers are inputted by an operator. These identifiers identify the particular document being produced for publication, the client and other identification information.

In step 4, a parameter activation table is loaded. This table includes flags which activate or deactivate various document parameter values. The rules and the table are structured to represent Document Type Definition (DTD) information in the system so that DTD information may be automatically processed. In most instances, the activation table is loaded simply by the operator selecting a publisher (client) and the system automatically loading the values. This is performed in a matter of seconds and requires little operator skill, even through the parameter values deal with complex typesetting and publication technical issues.

In step 5 the document is automatically prepared and cleaned. This involves the system processor applying typesetting rules such as removing multiple spaces. In addition, various rules are applied for consistency such as removing spaces from around mathematical symbols. Also, spelling mistakes are corrected using a spell-checker program. Tables and figures are moved to the end of the document to facilitate later processing steps.

In step 6 the document is tagged with internal system tags. The system progresses through document sections in sequence, in this embodiment the frontmatter, bodymatter, backmatter, tables and figures and the cross references. The tags are subsequently of benefit in automatically converting the document to SGML. To perform tagging, the system generates prompts for the operator and, based on the operator's responses and internally stored rules and tables, the system recognizes elements of the sections and tags them accordingly.

An important aspect of the system operation to automatically tag in step 6 and to perform automatically recognition in subsequent process steps is the underlying pattern matching method. The parameter values inputted in step 4 set a sequence of sections which the system expects to read. This sequence determines activation of programs in sequence, each relating to a document section. Each such program is dedicated to the associated section and accesses a dedicated set of relatively small look-up tables. This pattern-matching action allows very fast pattern recognition and so the system can typically make one pass through a document-involving both recognition and insertion in a matter of several seconds.

Also, this pattern matching technique is modular as it allows editing of patterns on a section-by-section basis.

An example of a tagged section is shown in FIG. 3. It will be clear from FIG. 3 that tagging is quite comprehensive. Each tag identifies an element of the document structure. The elements are typically sub-divisions of document sections such as frontmatter. For example, <snm> tags surname, <frm> tags forename, <pub.name> tags the publisher name, <sbt> tags sub-title start, and </sbt> tags subtitle end. The solid rectangular symbol tags end of flat text of the document in certain parts such as the author section. It will be appreciated that tagging is achieved very quickly despite the complex nature of document information because of use of code and look-up tables dedicated to sections of the documents. These are in turn set by the loaded parameter activation table.

Another aspect of the tagged document is that the text and the tags themselves are each displayed by the system with a highlighting colour which indicates the nature of what is being displayed. The colours are not recognised by the system for automatic processing, but instead are generated by the system to allow operator interaction in a comprehensive and quick manner. The colours allow the operator to immediately visually delimit the tagged elements and to quickly intervene if errors arise. To allow such interaction, the system pauses processing for limited periods of several seconds at specific intervals.

In step 7 the system performs copy-editing. This involves spell-checking and grammar-checking the document. The processor operates according to a find/replace program which automatically breaks down character strings to validate internal fonts used. For example, the author may mean $x^2_3$ but may have used $x^23$, $^{x2}3$, or $x_2^3$ at different places in the text. The system converts all instances of x23 into their correct form. As part of the editing step 7, the system converts styles in the document into their correct form as required by the document parameter values. A particular example is bibliographic reference style. Some publishers require these references to be name/date references, while others have these references numbered. For example, if the first reference in a document is a reference to an article published by "Smith and Jones" in 1998 in the name/date format, the text for this in the bibliography group would be ordered alphabetically and so would therefore be about half way down the list. On the other hand, in a numbered reference format, the text would be at the start of the bibliography list as it is the first one cited. The system prompts the operator to select between these styles and then automatically implements them by generating a list of all of the references and sorting them accordingly. Finally, the editing step 7 involves pulling all floating elements to the end of the document to facilitate faster handling at a later stage in the process.

This work completes a preparatory stage of the process and this stage is then verified as illustrated in FIG. 1(*b*) in steps 8 to 15. In step 8 the tags are automatically compared with an internally-stored set of reference tags. This comparison is performed according to the received document parameter values. The order and nesting of the tags are checked in steps 9 and 10, again according to the document parameter values. In step 11 symbols within the document are checked to locate any unknown one. This is performed by automated searching for characters which are not in the ranges 1–9, a–z, or A–Z and do not match a list of valid characters held by the system. Any unknown characters found in the document are reported for correction.

In step 12 cross-references are checked for validity. Cross references include bibliographic references and references to tables, figures, and footnotes. This involves the system making a list of the items referred to in the memory. The system then checks each reference in the body of the document. The system reports on references that cite any non-existent items and items that should be referred to but are not. As for steps 8 to 11, errors found are reported. However, in addition to step 12 there is an additional step 13 in which a list of unlinked cross-references is generated to prompt feedback by the operator. Generation of error messages is indicated by the step 14, and correction by step 15. The correction may involve interactive input by the operator.

Referring now to FIG. 1(*c*), the final phase of the process is illustrated. In step 20 every symbol and character not in the 1–9, a–z, and A–Z ranges, are checked against a list to locate the SGML code for that character. The SGML code is substituted in the text automatically. In step 21, tags which were inserted in the preparation stage of the process are converted to their SGML equivalent. Again, this is automated because the tags are simply checked against a list in a look-up table and substituted. In step 22 equations and foreign objects in the document are converted to their correct SGML tags. This involves the system transmitting commands to convert the object into a format which can be understood by an application. For example, for a mathematical equation, a command is sent to a "MathType™" application to convert the equation into a text equivalent of the object's code. The system then converts this into SGML by searching the (now text) object and process sub-objects. Floating elements are converted to SGML and are embodied in the SGML document at the correct position in step 23. For example, the document parameter values may require the "floats" to be at the end of the body of the document, while others require each float to be located immediately after the first reference to it. The floats are converted based on rules held in memory. These rules are taken from both document parameter values and the float structure so that, for example, tables will always have cells and rows and this structure is used in the process.

A sample of an SGML file is shown in FIG. 4. It will be clear from FIG. 4 that a structured document is quite complex and requires specialist knowledge. If the structured document were to be produced manually, it would be a very time-consuming exercise and would also be error-prone.

In step 24 the SGML file is passed through a parser to ensure that the SGML is perfectly correct. This parser is a tool which exhaustively checks and validates the file against the complete document parameter values. This ensures that the correct set of document parameter values are used as are the various rules held by the system. This acts as a system check and reports any errors.

An intermediate-output SGML file is provided in step 25 and this is used as the basis for the final output. For example, there may be DTD-specific conversion in step 27 to provide a final output SGML file in step 28. Alternatively, there may be journal-specific conversion in step 29 with typeset code editing in step 30 and a postscript output generated in step 31. Thus, the output SGML file may be converted into the typeset code required to correct style and display the document for a typesetting system. Because the document provided in step 26 is in SGML format, many alternatives are possible.

It will be appreciated that the invention provides a process which generates a structured document in a highly-controlled manner whereby little operator skill is required. This in effect bridges the gap between authoring a document and having it ready for publication. The author can work in his or her preferred manner without the need to have any knowledge of the publication process and structured formats—the process taking the author's output and generating the structured document. Another important advantage of the invention is the fact that the output structured document is of excellent quality because of the automatic validation steps of the process.

In summary, the process allows a typesetter/publisher take an authored document in any format and generate a structured document for publication very quickly, without the need for highly skilled operators, and with excellent quality.

The invention is not limited to the embodiments described, but may be varied in construction and detail within the scope of the claims.

What is claimed is:

1. A document production process carried out by a system with a processor having an editor interface and memory access means, the process comprising the steps of:

writing a document having characters in a word processor format to memory;

writing document publication parameter values to memory, said values representing Document Type Definition information for a target structured document;

automatically correcting the document according to typesetting rules;

automatically tagging the document with internal system tags to delimit character strings by inserting said tags next to the associated character strings, the tagging being performed according to the publication parameter values and operator responses, and in which said parameter values set a sequence of sections of the document, said sequence determining activation of tagging programs in sequence, each said tagging program having code for tagging an associated document section; and automatically converting the document to a structured format by substituting said tags and non-standard characters with structured format code to provide a structured document.

2. The process as claimed in claim 1, wherein conversion is performed by automatic comparison of said tags with reference tags stored in look-up tables.

3. The process as claimed in claim 2, wherein the conversion step includes the sub-steps of recognizing foreign objects in the document, passing the foreign objects to a separate process, converting the foreign objects to a text format, and subsequently processing the text for converting to the structured format.

4. The process as claimed in claim 1, wherein the process further comprises the step of parsing the structured format code for final validation.

5. The process as claimed in claim 1, wherein the document parameter values are written as an array of flags to load an activation table which activates and deactivates parameter options.

6. The process as claimed in claim 1, wherein the process further comprises the step of copy-editing the document after tagging by automatically converting words according to a break-down of the word characters.

7. The process as claimed in claim 6, wherein the copy-editing step includes the sub-steps of building an array of document bibliographic references by automatic recognition and subsequently sorting according to an operator-inputted sort criterion.

8. The process as claimed in claim 1, comprising the further step of automatic pre-conversion validation of said tags, in which said tags are compared with reference tags and order and nesting of said tags is validated according to the document publication parameter values.

9. The process as claimed in claim 8, wherein the pre-conversion validation step includes sub-steps of automatically locating any invalid symbols and generating corresponding error messages.

10. The process as claimed in claim 9, wherein the pre-conversion validation step includes sub-steps of automatically identifying document bibliographic references and references to tables, figures, and footnotes, building an array of said references in memory, and searching to determine if any items indicated by said references do not exist in the document.

11. A document production system comprising a processor having an editor interface and memory access means, the processor comprising:

means for writing a document having characters in a word processor format to memory;

means for writing document publication parameter values to memory, said values representing Document Type Definition information for a target structured document;

means for automatically correcting the document according to typesetting rules;

means for automatically tagging the document with internal system tags to delimit character strings by inserting said tags next to the associated character strings, the tagging being performed according to the publication parameter values and operator responses, and in which said parameter values set a sequence of sections of the document, said sequence determining activation of tagging programs in sequence, each said tagging program having code for tagging an associated document section; and means for automatically converting the document to a structured format by substituting said tags and non-standard characters with structured format code to provide a structured document.

\* \* \* \* \*